Patented Feb. 19, 1946

2,395,380

UNITED STATES PATENT OFFICE 2,395,380

LOW TEMPERATURE-HIGH TEMPERATURE LUBRICANT

John D. Morgan, South Orange, and Russell E. Lowe, East Orange, N. J., assignors to Cities Service Oil Company, New York, N. Y., a corporation of Pennsylvania No Drawing. Application February 20, 1945, Serial No. 578,936

5 Claims. (Cl. 252—49.8)

This invention relates to lubricants and more particularly to an improved synthetic oil for use under low temperature operating conditions, as well as to normal and somewhat higher than normal temperatures.

The problems which arise in the lubrication of aircraft accessories flow largely from the fact that these precision instruments, control motors, electrical relays and the like, are alternately subjected to the extremely low temperatures prevailing at high altitude and to ground temperatures ranging from moderate to somewhat higher values. The difficulty arises not so much from the requirement that the oil operate satisfactorily at low temperatures, or at high temperatures, but because it must retain its effective lubricating values under both conditions. Petroleum oils have been prepared, for example, which give excellent performance under the intense cold which prevails at high altitudes, but become water-thin at normal ground temperatures and either flow freely from the bearings or even quickly evaporate away. Conversely, it represents no problem to prepare a petroleum oil which will function with entire satisfaction throughout the normal range of temperatures encountered in ground operation. These oils have little utility in aircraft work, however, because they thicken rapidly as the temperature falls and become so viscous as either to impair the operation of the equipment or perhaps to cause it to fail entirely. Since the average plane spends as much time on the ground as it does in the air, it is rather obvious that neither of these petroleum lubricants will suffice, and that a satisfactory oil must be one which will retain a fairly uniform viscosity over a wide range of temperatures.

It is also characteristic that this kind of equipment is generally called upon to operate continuously for long periods of time without supervision or servicing. Thus the frequent and regular lubrication of bearings which are located within protective casings, as in gyro compasses and other precision indicating instruments, is obviously impractical, while control motors, electrical relays and other accessory devices are usually installed in remote places which are not readily accessible for frequent oiling. In a practical sense, this means that the lubricating oil which is used for accessories of the foregoing kind must be one which can be applied to the bearings in the course of manufacture of the equipment, and which is of such a character that it will retain its lubricating effectiveness for long periods of time between normal servicing operations. The oil must therefore have a very low spread factor, that is to say, it must stay where it is put and not creep away from the bearings, leaving them dry, and perhaps discoloring adjacent surfaces or even damaging them. Again, the oil must be highly resistant to oxidation, polymerization, or other chemical change which will produce heavy gums and destroy its lubricating value, and it must have a very low vapor pressure so that the liquid will not rapidly be lost by evaporation.

Various special lubricants have been developed for aircraft accessories, having one or more properties such as to meet the foregoing requirements. All of these preparations have been formulated upon the assumption that the minimum temperature under which they will be called upon to function satisfactorily would be of the order of —40 to —60° F. The facts of actual aircraft operation in the past few years have proved otherwise, and while a minimum temperature requirement has not yet been set, there have been many instances where aircraft have experienced the devastatingly low temperature of —90° F. It need hardly be said that under these conditions the special lubricants proved to be as useless as the petroleum oils mentioned above. It may also be noted that many industrial testing processes are carried out nowadays at temperatures well below those for which the aforementioned special lubricants were devised, and no satisfactory lubricants have heretofore been available for this work.

The principal object of the present invention is to provide a light bodied oil having good lubricating properties at temperatures of the order of —90° F. or lower, and which retain their effectiveness at normal temperatures and up to 125—150° F.

It is a further object of the invention to provide an oil of the foregoing character which has a very low spread factor, being much below that of the conventional petroleum oil of the same general body, so that it will stay where it is put and not creep to any excessive degree.

A further object of the invention is to provide a lubricating oil of the foregoing kind which is composed entirely of readily available synthetic materials so that it may be reproduced with a degree of precision which is not possible in the production of petroleum and other natural lubricating fluids.

We have found that the problems outlined above may be solved, and the objects of the invention attained by preparing a lubricant composed entirely of tri ortho cresyl phosphate, ethylene glycol monobenzyl ether, and tri ortho butyl phosphate. These liquids are fully miscible in one another, and may be employed in the proportions hereinafter indicated to provide extremely satisfactory lubricants having a variety of special properties which fit them particularly to the lubrication of aircraft accessories and other equipment which is called upon to operate in more or less regular alternation at medium high temperatures and under conditons of intense cold.

One example of a lubricant embodying the invention has the following formular by weight:

|  | Per cent |
|---|---|
| Tri ortho cresyl phosphate | 40 |
| Ethylene glycol monobenzyl ether | 30 |
| Tri ortho butyl phosphate | 30 |

This product is a clear, oily liquid having a flash point in excess of 265° F., and a cloud point which appears to be at some value well below −96° F. A precise determination of the latter factor has not been made up to the present time because of our inability to subject the product to a sufficiently low temperature. It is apparent, however, from this data that the liquid will remain clear and stable, with no tendency to separate into its several constituents, over a wide range from some value well below the minimum temperatures encountered in aircraft operation to temperatures in excess of those normally encountered at ground levels.

This liquid has been demonstrated to have excellent load carrying properties and lubricating values over extremely wide ranges of temperature change. Its viscosity appears to be of the order of, 500 centistokes at −90° F., a condition which allows for free and easy turning of the shaft with little or no effort. In one test, a small brass shaft having a diameter of about one-sixteenth inch was found to turn easily in its bearing lubricated, at a temperature of −112° F., there being no apparent evidence of any congealing of the liquid at this extreme condition nor of any tendency of the shaft to stick. Further tests indicated that the material is entirely satisfactory for the lubrication of electrical relays and instrument bearings at temperatures ranging from −70° to somewhere approaching the existing low temperature mentioned above.

So much for the low temperature characteristics of the product. At the other extreme condition, normal atmospheric temperatures and above, it has proven to be equally satisfactory. The viscosity of the liquid at 100° F. appears to be somewhere around 2 to 3 centistokes. The body of the oil at this temperature is fairly light, but its load carrying ability and general lubricating values remain at a high figure, being considerably better than those of a petroleum oil of the same viscosity at the same temperatures. We have found, for example, that the oil will support heavy unit loads under continuous operation at 125° F., and that if operation is intermittent, the maximum permissible temperature may be about 150° F.

The spread factor of the oil, that is to say, its tendency to creep, was determined by placing a drop of it on a metal plate, and gauging the increase in area after a predetermined time, in accordance with the test procedure laid down in Navy Aeronautical Specification M–537. The results of this test showed that our lubricant had a spread factor of somewhat less than ten per cent, which is, of course, far less than than of any normal petroleum oil, and approaches that of many of the finest watch oils. Of perhaps equal importance, the liquid has proven to have a very low vapor pressure and a correspondingly small tendency towards volatility. The rate of evaporation is, for example, considerably less than that of highly refined Pennsylvania lubricating oil of equal viscosity.

Tests have also been made to determine the corrosive effects of our lubricant with respect to steel, copper, aluminum and other standard alloys, as well as upon Babbitt and other widely used bearing metals. The results of this work have indicated that the synthetic oil has no corrosive action upon any of the standard metals of construction. It also has been demonstrated that our product is non-toxic to human beings, and its use occasions no hazard, therefore, either for the operator who applies it or for the equipment to which it is applied.

The example composition was developed as a lubricant for certain special electrical relay equipment employed in the operation and control of heavy bombing aircraft. The urgent demand for it arose out of the tracing of several fatal crashes to the sticking of relays under extremely low temperature conditions, and a consequent failure of associated control mechanism. It has been found that the new lubricant performs entirely satisfactorily at temperatures of the order of −90° to −100° F., with no tendency to freeze the relay equipment, and that it remains effective at ground temperature and even to so high a temperature as 150° F. In addition, its low vapor pressure and spread factors, and freedom from oxidation and other change mean that it will stay in place and retain its lubricating effectiveness over long periods of time.

We have discussed the lubrication of aircraft accessories at some length only because the problems which it raises are typical of those occurring in high temperature-low temperature lubrication work. Very similar problems arise, however, in the maintenance of the automatic recording equipment carried by free weather observation balloons, in the lubrication of instruments, relays and similar devices of the kind used in "cold" chambers wherein industrial testing is carried on, and in various other places of which examples will readily come to mind. We have found that lubricants may be prepared in accordance with our invention for meeting a wide variety of the problems which arise in general low temperature-high temperature work. Thus, we have found that satisfactory lubricants having a wide range of special properties may be prepared by mixing together from thirty to fifty per cent by weight of tri ortho cresyl phosphate, from twenty to forty per cent by weight of ethyl glycol monobenzyl ether, and from twenty to forty per cent by weight of tri ortho butyl phosphate.

In this connection it should be observed that tri ortho cresyl phosphate is an oily liquid having excellent boundary lubrication properties, and an exceptionally low spread factor. In addition, the vapor pressure of the material is insignificant at ordinary and medium high temperatures, being substantially zero at temperatures up to about 400° F. Its solidification point is, however, comparatively high, being about −40° F. The identified glycol ether has some slight lubricating properties, a very low vapor pressure of about 0.02 mm. of mercury at 67° F., and a solidification point which is below −80° F. It also has the unique property in solution with tri cresyl phosphate, of lowering the effective solidification point of the mixture much below that of tri cresyl alone. Tri ortho butyl phosphate has the general character of a light spindle oil at normal temperatures, and good load carrying ability in boundary lubrication. While its vapor pressure is somewhat lower than that of the identified glycol ether, so that it adds nothing to the high temperature characteristics of the mixture, its exceptionally low freezing point of under −112° F. materially improves the performance of the entire mixture under conditions of intense cold. It may also be noted that while the spread factor of the tri butyl phosphate is much higher than that of tri cresyl phosphate alone, the mixture tends to take on the very low spread characteristics of the latter ingredient. It is evident from the foregoing that the properties of the several ingredients may be adjusted within the limits specified to attain a wide range of excellent synthetic lubricants which will perform satisfactorily over a very wire range of temperature conditions, and which also have very low spread tendencies so that they will stay where they are put in meeting the needs of individual lubrication cases.

It will also be noted that our lubricant is prepared entirely from synthetic ingredients of known standards which are readily available in the open market. This has the great advantage of enabling us to duplicate a lubricant having precisely the properties that we want over and over again, thus giving us a control of the final product which cannot readily be attained in the preparation of petroleum and other natural oils.

Having described our invention, what we claim as new is:

1. A synthetic lubricating oil comprising a homogeneous liquid solution of from 30 to 50 per cent by weight of tri ortho cresyl phosphate, from 20 to 40 per cent by weight of ethylene glycol mono benzyl ether, and from 20 to 40 per cent by weight of tri ortho butyl phosphate.

2. A synthetic lubricating oil according to claim 1 characterized in that said solution has a clouding point which is not above −96° F.

3. A synthetic lubricating oil according to claim 1 characterized in that said solution has a clouding point which is not above −96° F., and a flash point of not less than 265° F.

4. A synthetic lubricating oil according to claim 1 characterized in that said liquid has a spread factor of not more than ten per cent.

5. A synthetic lubricating oil comprising a liquid solution of about 40 per cent by weight of tri ortho cresyl phosphate, about 30 per cent by weight of ethylene glycol monobenzyl ether, and about 30 per cent by weight of tri ortho butyl phosphate.

JOHN D. MORGAN.
RUSSELL E. LOWE.